United States Patent [19]

Forsslund

[11] E Re. 30,813

[45] Reissued Dec. 1, 1981

[54] INTERMITTENCE-RESPONSIVE WORKING-TIME INDICATOR

[76] Inventor: Erik E. Forsslund, Altegghalde 2, CH-6045 Meggen, Switzerland

[21] Appl. No.: 75,174

[22] Filed: Sep. 12, 1979

Related U.S. Patent Documents

Reissue of:

[64] Patent No.: 4,049,952
Issued: Sep. 20, 1977
Appl. No.: 682,862
Filed: May 3, 1976

[30] Foreign Application Priority Data

May 16, 1975 [SE] Sweden ..... 7505631

[51] Int. Cl.[3] ..... G06M 3/02; G07C 3/04

[52] U.S. Cl. ..... 235/92 T; 235/92 CC; 235/92 PE; 328/129

[58] Field of Search ..... 235/92 T, 92 CC, 92 PE, 235/92 PD; 328/48, 129; 368/118, 119, 108

[56] References Cited

U.S. PATENT DOCUMENTS 3,356,820 12/1967 O'Neal ..... 328/129
3,735,101 5/1973 Stewart ..... 235/92 T
3,936,745 2/1976 Harrington ..... 328/129

*Primary Examiner*—Joseph M. Thesz
*Attorney, Agent, or Firm*—Schwartz, Jeffery, Schwaab, Mack, Blumenthal & Koch

[57] ABSTRACT

A working-time indicator that resets itself to a zero position as soon as the supervised work is interrupted for a predetermined, preferably adjustable minimum period of time but neglects all pauses of a shorter duration comprises, in combination, a first or working-time meter that is adapted to measure and indicate the duration of a single period or a succession of spaced periods between an arbitrary number of start and stop pulses received thereby, said first meter being resettable to a zero position by means of a resetting pulse, and a second or idling-time meter that is adapted to measure the period of time following immediately after each stop pulse to said first meter and to compare the length of each such period of idling with a preferably adjustable reference value, means being provided for automatically resetting said second meter to a zero position, if and when said first meter receives a new start pulse before the length of the period of idling has reached the reference value, and means being also provided for supplying a resetting pulse to said first meter at the very moment when the length of the period of idling measured by said second meter equals said reference value.

7 Claims, 1 Drawing Figure

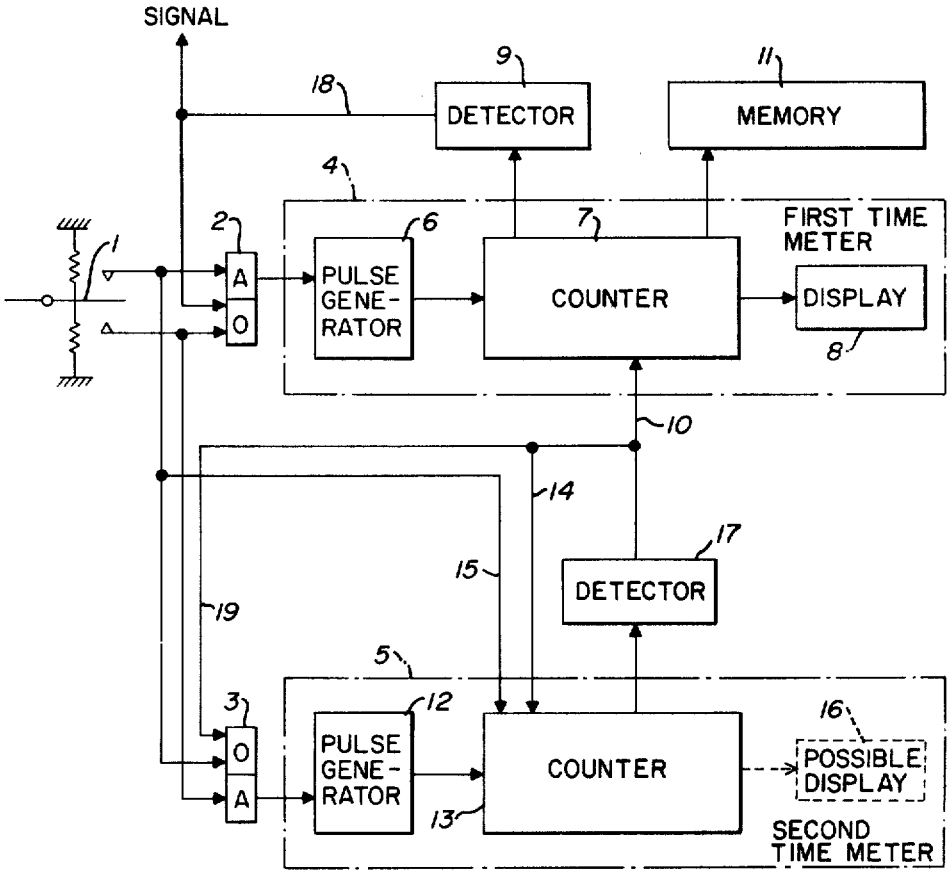
SIGNAL
DETECTOR
MEMORY
FIRST TIME METER
PULSE GENE-RATOR
COUNTER
DISPLAY
A
O
DETECTOR
PULSE GENE-RATOR
COUNTER
POSSIBLE DISPLAY
SECOND TIME METER
1
2
3
4
5
6
7
8
9
10
11
12
13
14
15
16
17
18
19

INTERMITTENCE-RESPONSIVE WORKING-TIME INDICATOR

Matter enclosed in heavy brackets [ ] appears in the original patent but forms no part of this reissue specification; matter printed in italics indicates the additions made by reissue.

This invention refers to an intermittence-responsive working-time indicator of the kind comprising a working-time meter including means for measuring and indicating the duration of a single period between a start pulse and a subsequent stop pulse supplied to said meter as well as the total duration of a succession of spaced periods between an arbitrary number of start pulses and subsequent stop pulses supplied to said meter and, in addition thereto, means for resetting said meter to a zero position at the receipt of a resetting pulse. The start and stop pulses received by said meter are preferably electrical ones, but mechanical or any other known kind of pulses may be equally useful.

In fact, any change in state, position, temperature etcetera may be considered as a pulse.

The term "working-time indicator" is used in this specification and in the following claims to define a time measuring and indicating instrument that can be used for determining, within an arbitrarily chosen unit of time, the effective working time of a machine, an apparatus, a vehicle or a person working intermittently or periodically, i.e., with certain pauses or breaks. A simple and well known example of such a working-time indicator is a timer which starts and stops when actuated in a certain manner for measuring the duration of a single period between a start pulse and a stop pulse or the total duration of any desired number of such periods and which may be reset to a zero position by the actuation of a resetting knob. Although such a timer is commonly actuated by hand, i.e., is controlled by manual pressure pulses, there are similar time measuring instruments or working-time indicators with adding features which receive the necessary pulses directly from the machine or apparatus to be supervised.

However, in many cases the effective working-time per selected unit of time is a factor of no particular interest. Instead the important thing is to see to it that a machine or apparatus or even a worker is not overstrained or overtired but, after each given period of practically uninterrupted work, is more or less forced to take a continuous pause of a predetermined minimum length before the work is recommenced, it being presupposed that a pause of shorter duration will not suffice for an acceptable recovery.

As a first example of such a case it may be assumed that an electric arc welding unit is used under conditions requiring that the total effective welding time per every 10 minutes does not exceed 4 minutes and that the minimum period of idling or rest before the beginning of a new maximum service sequence has to be at least 6 minutes in order to protect the welding unit from overheating. Because of short pauses for electrode changes and the like, which are all too short to permit any noticeable recovery or cooling of the unit, the effective welding time of each service sequence will be composed of a plurality of welding or working periods, each of a shorter duration than the maximum of 4 minutes. These periods have to be added together unless there is a pause of at least 6 minutes between two successive ones of them, it being understood that a 6 minute pause will always make the unit ready for a renewed maximum service sequence. An indicating time measuring instrument that measures and adds all the short welding periods, as long as the latter follow each other rather closely, that releases a warning signal, when the sum of these welding periods reaches a maximum value of 4 minutes, and that is automatically reset to zero position after each period of idling or complete rest having a duration of at least 6 minutes, would then be a valuable means for insuring that the welding unit is not knowingly overstrained.

As a second example it may be assumed that investigations have shown that a satisfactory road safety requires that a car or truck driver shall not drive his vehicle practically uninterruptedly for more than say 5 hours and that he has to pause for at least 30 minutes before starting another driving period of such length. Shorter interruptions in the work at the steering wheel, such as those needed for fuel refills, loading etcetera or those caused by traffic obstacles, must not be counted as recovery time. In such a case, for insuring that the driver does not overtire himself there is a need for an instrument which automatically measures the duration of each driving period or group of driving periods that follow each other too closely, indicates the sum of such periods and releases a warning signal when the sum reaches the maximum acceptable value of 5 hours, but which is also automatically reset to zero position every time the driving work is interrupted for at least the 30 minutes chosen as the minimum acceptable duration of a pause, irrespective of whether the driving time has reached its maximum value or not.

Many similar cases are feasible where a working-time indicator that reacts if the work is interrupted for a predetermined, possibly adjustable period of time of considerable length but neglects shorter interruptions or pauses, and which is thus to be looked upon as intermittence-responsive, would meet a similar need, and the present invention has for its object to provide an instrument with the qualities required for such a purpose.

The working-time indicator according to the invention is primarily characterized by the fact that the working-time meter referred to hereinbefore, which is in fact a first time meter, is combined with a second nonadding time meter serving as an idling-time meter, said second meter including in turn means for measuring the idling-time following immediately after each stop pulse to said first meter and comparing the idling-time thus measured with a value stored in said second meter, means for automatically resetting said second meter to a zero position whenever a new start pulse is received by said first meter before the measured idling-time has reached said stored value, and means for supplying a pulse to said resetting means of said first time meter at the very moment when the measured idling-time equals said stored value.

Further features of the invention will become apparent from the following description of a preferred embodiment thereof which has been illustrated in the accompanying drawing. More specifically the drawing shows a block diagram of various interconnected electronical components which are each and all well known per se and which in co-operation form an intermittence-responsive working-time indicator.

In the drawing 1 designates a switch having a central contact member that is movable from an inoperative intermediate position, as shown, into either one of two operative positions, viz. an upper one to indicate the start of work to be supervised and a lower one to indicate the stop of said work, the movable contact member being normally held in its inoperative intermediate position during periods of continuous work as well as during pauses or periods of rest so as to only deliver short pilot pulses through either one of two main paths to two different input relays 2 and 3, respectively. The relay 2 belongs to a working-time meter that is generally designated by 4, whereas the relay 3 belongs to an idling-time meter that is generally designated by 5. The two input relays 2 and 3 may suitably take the form of pulse-operated switches of the type being self-locking in two positions, namely in a first operative one A in which current is supplied from an arbitrary source, not shown, to the related time meter, and in a second, inoperative one O in which the supply of current thus established is interrupted. When the movable contact member of switch 1 is moved to its upper position the input relay 2 of the working-time meter 4 is caused to occupy its operative position whereas at the same time the input relay 3 of the idling-time meter 5 is caused to occupy its inoperative position. Similarly, when the movable contact member of switch 1 is moved to its lower position the input relay 3 of the idling-time meter 5 is caused to occupy its operative position whereas at the same time the input relay 2 of the working-time meter 4 is caused to occupy its inoperative position.

In the example shown the working-time meter 4 includes an electronic pulse generator 6 which in operation delivers a regular train of pulses to an adding pulse counter 7 that is connected to a display unit 8 which suitably may be digital and which visually indicates the working time reached after the last reset. The pulse counter 7 is also connected to a detector or sensor unit 9 which ascertains when the pulse counter reaches a predetermined time or pulse sum value, which is stored in the unit 9 and which may be adjustable at least within certain limits in order to make the instrument adaptable to various needs. The detector unit 9 is arranged, when the predetermined time value has been reached in the pulse counter 7, to release one or more signals and, in the case shown, to simultaneously interrupt the continued operation of the working-time meter 4 by sending an inactivating pulse to the input relay 2. As an alternative said last mentioned pulse delivery may be omitted so that the working-time meter 4 continues its time-measuring activity while only a lasting warning signal of any suitable kind, e.g., and optical or acoustical one, is given off. The pulse counter 7 is of such design that it will be reset to zero position if and when a resetting pulse is supplied to it through a lead 10. In addition, the pulse counter 7 is connected to a storage unit 11 which at each resetting of the pulse counter stores and possibly also records the pulse sum value, i.e., the working-time value, reached by the pulse counter at the instant when it was reset so that at least the preceding value may be recalled from the storage unit if needed for a possible subsequent check-up. Of course, the storage unit or memory 11 may be omitted, for instance in cases where the working-time indicator itself interrupts the work of the supervised machine or apparatus and does not permit the work to recommence before the predetermined idling-time has come to an end.

The idling-time meter 5 in its turn similarly includes an electronic pulse generator 12 which in operation delivers a regular train of pulses to a non-adding pulse counter 13 that is adapted to be reset to a zero position as soon as it receives a resetting pulse either through a lead 14 or through a lead 15. The pulse counter 13, which may have its own display unit 16 for visualizing the passing of the idling-time, is connected to a detector or sensor unit 17 which ascertains when the pulse counter 13 has reached a predetermined idling-time or pulse sum value that is stored in the unit 17 and is preferably also adjustable, at least within certain limits, in order to make the instrument adaptable to various needs.

The working-time indicator just described operates in the following manner: If and when the movable contact member of switch 1 is temporarily moved to its upper position to thereby indicate the start of the work to be supervised, this will result in a start pulse to the indicator which will move the input relay 2 of the working-time meter 4 into an operative position. Consequently the working-time meter 4 will start operating. By the same pulse the input relay 3 of the idling-time meter 5 will be moved to its inoperative position which means that the idling-time meter will become inoperative. Finally the very same pulse will, in addition, reset the pulse counter 13 of the idling-time meter to a zero position through the lead 15. As long as the central contact member of the switch 1 is not moved to its lower position, the working-time meter 4 will continue to operate at least for a certain period of time, which means that the pulses sent out at regular intervals from the pulse generator 6 are counted by the pulse counter 7 while the time value corresponding thereto is indicated by the display unit 8. If now the pulse counter 7 reaches the predetermined time value stored in the detector unit 9 the latter will send out through the lead 18 a pulse which may be used for releasing a signal, e.g., by closing a circuit including a ringing bell (not shown), and which is also used for moving the input relay 2 of the working-time meter 4 to an inoperative position. Of course, the display unit 8 of the working-time meter is now indicating the maximum working-time. The entire system is blocked and there will be no change until the movable contact member of switch 1 has been temporarily moved to its lower position and the idling-time meter 5 has been given sufficient time to deliver a resetting pulse to the counter 7.

If on the other hand the movable contact member of switch 1 is moved to its lower position before the detector unit 9 has released the signal, the input relay 2 will be shifted to an inoperative position whereas instead the input relay 3 of the idling-time meter will be shifted to an operative position. This will cause the generator 12 to start feeding pulses at regular intervals to the pulse counter 13. If now the pause up to the moment, when the switch 1 is again moved to its upper position, is shorter than the predetermined minimum period of idling stored in the detector unit 17 nothing else will happen than that the working-time meter 4 is again started whereas the idling-time meter 5 becomes inoperative at the same time as its pulse counter 13 is reset to zero position. Accordingly, as distinguished from the pulse counter 7 the pulse counter 13 does not add any different trains of pulses. If, however, the pulse counter 13 reaches the predetermined minimum idling-time value, the detector unit 17 will send out a resetting pulse not only through the lead 10 to the pulse counter 7 of the working-time meter 4 but also through the leads 10 and 14 to the pulse counter 13 of the idling-time meter 5 and at the same time the same pulse will through lead 19 reach the inlet relay 3 of the idling-time meter 5 and move it to an inoperative position. Both the two time meters 4 and 5 are thus made inoperative and also reset to zero position at one and the same time in the latter case. When the pulse counter 7 of the working-time meter 4 is reset to zero position together with its display unit 8, the value just reached by the pulse counter 7 will be fed into the storage unit 11 where it is either recorded in a suitable manner or, if the storage unit is self-erasing, will replace a previously entered value. The storage unit 11 may include a display unit (not shown) for making the stored value or values directly readable, for instance in digital form.

It should be understood that the working-time indicator embodying the invention may be built up in many different ways, of which the foregoing is only an example. Also it has to be understood that the details and components of an indicator embodying the invention may be changed within wide limits without hazarding the desired result, namely an automatic resetting of the working-time meter every time a predetermined minimum period of idling has come to an end.

In practice an electronic from of the working-time indicator substantially as shown and described hereinbefore is mostly preferred. However, should for any reason electronic equipment be objectionable, a mechanic or even hydraulic form of the working-time indicator may be built by following the same general directions. In all cases the primary switch or the corresponding source of primary pulses may be directly actuated by the machine or apparatus, the operation of which is to be supervised. If it is instead the question of supervising the work of a certain person at a machine or in a vehicle, it may in certain cases be necessary to supplement the working-time indicator with some form of device by means of which different persons may be identified so that the working-time indicator is also reset to zero position if a new person takes over the work.

I claim:

1. An intermittence-responsive working-time indicator comprising in combination I. a first time meter operative as a working-time meter and including a. means for measuring and indicating the duration of a single period between a start pulse and a subsequent stop pulse supplied to said first meter *and for measuring and indicating said period* as well as the total duration of an arbitrary number *greater than zero* of interspaced such periods while neglecting the intervals between them, and b. means for resetting said first time meter [to a zero position] at the receipt of a resetting pulse, II. a second time meter operative as an idling-time meter and including a. means for measuring the idling-time following immediately after each stop pulse to said first time meter, and b. means for resetting said second time meter [to a zero position] at the receipt of a resetting pulse [through either one of two separate reset inputs thereof], III. means for comparing the idling-time measured by said second time meter with a [stored] *reference* value and for supplying a pulse *at least* to said resetting means of the first time meter [as well as to one of said separate reset inputs of said resetting means of the second time meter] at the very moment when the measured idling-time equals said [stored] *reference* value, IV. [means for supplying a resetting pulse to the other one of said separate reset inputs of said resetting means of the second time meter at the receipt of each start pulse to said first time meter, and V.] means for starting the operation of said second time meter whenever a stop pulse is received by said first time meter, and for stopping the operation [thereof whenever it has become properly reset by a resetting pulse supplied to either one of its reset inputs] *of said second time meter whenever a start pulse is received by said first time meter, and*

*V. means connected to said resetting means of the second time meter for supplying a resetting pulse thereto before said second time meter is actuated to start measuring the duration of each new idling-time period.*

2. A working-time indicator according to claim 1 wherein said [stored] *reference* value is adjustable.

3. A working-time indicator according to claim 1 wherein means are provided for blocking said first meter, when the working-time indicated thereby reaches a selected maximum value.

4. A working-time indicator according to claim 1 [wherein means are provided for releasing] *further comprising means connected to said working-time meter for generating* a signal when the working-time indicated by said first meter reaches a selected value.

5. A working-time indicator according to claim 1 wherein said first meter is combined with a storage unit for memorizing a working-time value previously indicated by said first meter in a manner to make said memorized value readable at a later time, if needed, and wherein means are provided for automatically recording in said storage unit each value indicated by said first meter every time the latter receives a resetting pulse.

6. A working-time indicator according to claim 5 wherein said storage unit is of the kind from which a previously recorded value is automatically erased when a new value is entered.

*7. An intermittence-responsive working-time device comprising in combination:*

*I. a first time meter operative as a working-time meter and including means for measuring the duration of a single period between a start pulse and a subsequent stop pulse supplied to said first meter and for measuring said single period as well as the total duration of an arbitrary number greater than zero of interspaced such periods while neglecting the intervals between them,*

*II. means for resetting said first time meter at the receipt of a resetting pulse,*

*III. a second time meter operative as an idling-time meter and including means for measuring the idling-time between each stop pulse and subsequent start pulse supplied to said first meter,*

*IV. means for comparing the idling-time measured by said second time meter with a reference value, and*

*V. means for generating said resetting pulse to said first time meter when the measured idling-time of said second time meter equals said reference value.*

* * * * *